United States Patent
Keane (10) Patent No.: US 8,620,381 B2
(45) Date of Patent: Dec. 31, 2013

(54) ELECTRONIC ASSEMBLY FOR SECURING A SIM CARD

(75) Inventor: James Abe Keane, Wauconda, IL (US)

(73) Assignee: BlackBerry Limited, Waterloo (CA)

(*) Notice: Subject to any disclaimer, the term of this patent is extended or adjusted under 35 U.S.C. 154(b) by 527 days.

(21) Appl. No.: 12/691,953

(22) Filed: Jan. 22, 2010

(65) Prior Publication Data

US 2011/0183715 A1 Jul. 28, 2011

(51) Int. Cl.
*H04B 1/38* (2006.01)
*H04M 1/00* (2006.01)
*H01R 13/62* (2006.01)

(52) U.S. Cl.
USPC .................. 455/558; 455/550.1; 439/331

(58) Field of Classification Search
USPC ....................................... 455/558
See application file for complete search history.

(56) References Cited

U.S. PATENT DOCUMENTS

| | | | |
|---|---|---|---|
| 6,899,547 B1* | 5/2005 | Chang et al. | 439/65 |
| 2004/0102232 A1* | 5/2004 | Nuovo | 455/575.1 |
| 2006/0105640 A1* | 5/2006 | Vance | 439/862 |
| 2008/0283602 A1* | 11/2008 | Fagrenius et al. | 235/441 |
| 2010/0136816 A1* | 6/2010 | Ahn | 439/331 |

FOREIGN PATENT DOCUMENTS

| | | |
|---|---|---|
| EP | 1148694 | 10/2001 |
| GB | 2329055 | 3/1999 |

OTHER PUBLICATIONS

European Search Report dated Jun. 2, 2010; Application No. 10151372.9.

* cited by examiner

*Primary Examiner* — Lester Kincaid
*Assistant Examiner* — Andy Gu
(74) *Attorney, Agent, or Firm* — Novak Druce Connolly Bove + Quigg LLP; Timothy Clise (57) ABSTRACT

An electronic assembly for securing a Subscriber Identity Module (SIM) card includes: a printed circuit board (PCB) having opposed first and second sides and defining an aperture extending from the first side to the second side; and a SIM card holder comprising a base received in the aperture, electrical connectors located in the base and having a first end connected to the first side of the PCB and a second end opposite to the first end, contacts located on the second side of the PCB and connected to the second end of the electrical connectors, the contacts configured for interfacing with corresponding contacts of the SIM card, and a card retaining member attached to the second side of the PCB for releasably securing the SIM card attached to the second side of the PCB.

19 Claims, 8 Drawing Sheets

ELECTRONIC ASSEMBLY FOR SECURING A SIM CARD

TECHNICAL FIELD

The present disclosure relates generally to an electronic assembly, and more particularly to an electronic assembly for securing a SIM card.

BACKGROUND

Handheld electronic devices are continually evolving with an industry trend toward smaller and thinner products. Various components of a handheld electronic device contribute to the overall product thickness. One component that is often a large contributor to the overall thickness of a handheld electronic device is the Subscriber Identification Module (SIM) card ("SIM card"). The thickness added by the SIM card is often due to design constraints associated with the mounting of the SIM card holder within the handheld electronic device. For example, the SIM card should be removable; however, it should not be removable while the handheld electronic device is powered. As a result of this constraint, the SIM card is often mounted below or under the battery (or other removable components of the device). This contributes to the overall thickness of the handheld electronic device since the physical dimensions of the PCB, the SIM card holder, the SIM card, as well as the battery or other components positioned on top of the SIM card all contribute to the overall product thickness.

DETAILED DESCRIPTION OF EXAMPLE EMBODIMENTS

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure provides an electronic assembly for releasably securing a SIM card which aims to reduce the overall thickness of host portable electronic devices. In accordance with one example embodiment of the present disclosure there is provided a portable electronic device, comprising: a printed circuit board (PCB) having opposed first and second sides and defining an aperture extending from the first side to the second side; a housing defining an interior compartment; and a Subscriber Identity Module (SIM) card holder accessible from the interior compartment and configured to receive a SIM card, the SIM card holder being received in the aperture.

In accordance with one example embodiment of the present disclosure there is provided an assembly comprising: a printed circuit board (PCB) having opposed first and second sides and defining an aperture extending from the first side to the second side; and a Subscriber Identity Module (SIM) card holder accessible from the interior compartment and configured to receive a SIM card, the SIM card holder being received in the aperture.

In accordance with a further example embodiment of the present disclosure there is provided an assembly comprising: a printed circuit board (PCB) having opposed first and second sides and defining an aperture extending from the first side to the second side; and a SIM card holder configured for retaining a SIM card and comprising: a base received in the aperture; electrical connectors located in the base and having a first end connected to the first side of the PCB and a second end opposite to the first end; contacts located on the second side of the PCB and connected to the second end of the electrical connectors, the contacts being configured for interfacing with corresponding contacts of the SIM card; and a card retaining member attached to the second side of the PCB and configured for releasably securing the SIM card.

In accordance with yet a further example embodiment of the present disclosure there is provided a portable electronic device, comprising: portable electronic device, comprising: a printed circuit board (PCB) having opposed first and second sides and defining an aperture extending from the first side to the second side; a housing; and a Subscriber Identity Module (SIM) card holder for retaining a SIM card and comprising: a base received in the aperture in the PCB; electrical connectors located in the base and having a first end connected to the first side of the PCB and a second end opposite to the first end; contacts located on the second side of the PCB and connected to the second end of the electrical connectors, the contacts being configured for interfacing with corresponding contacts of a SIM card; and a card retaining member attached to the second side of the PCB and configured for releasably securing the SIM card.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
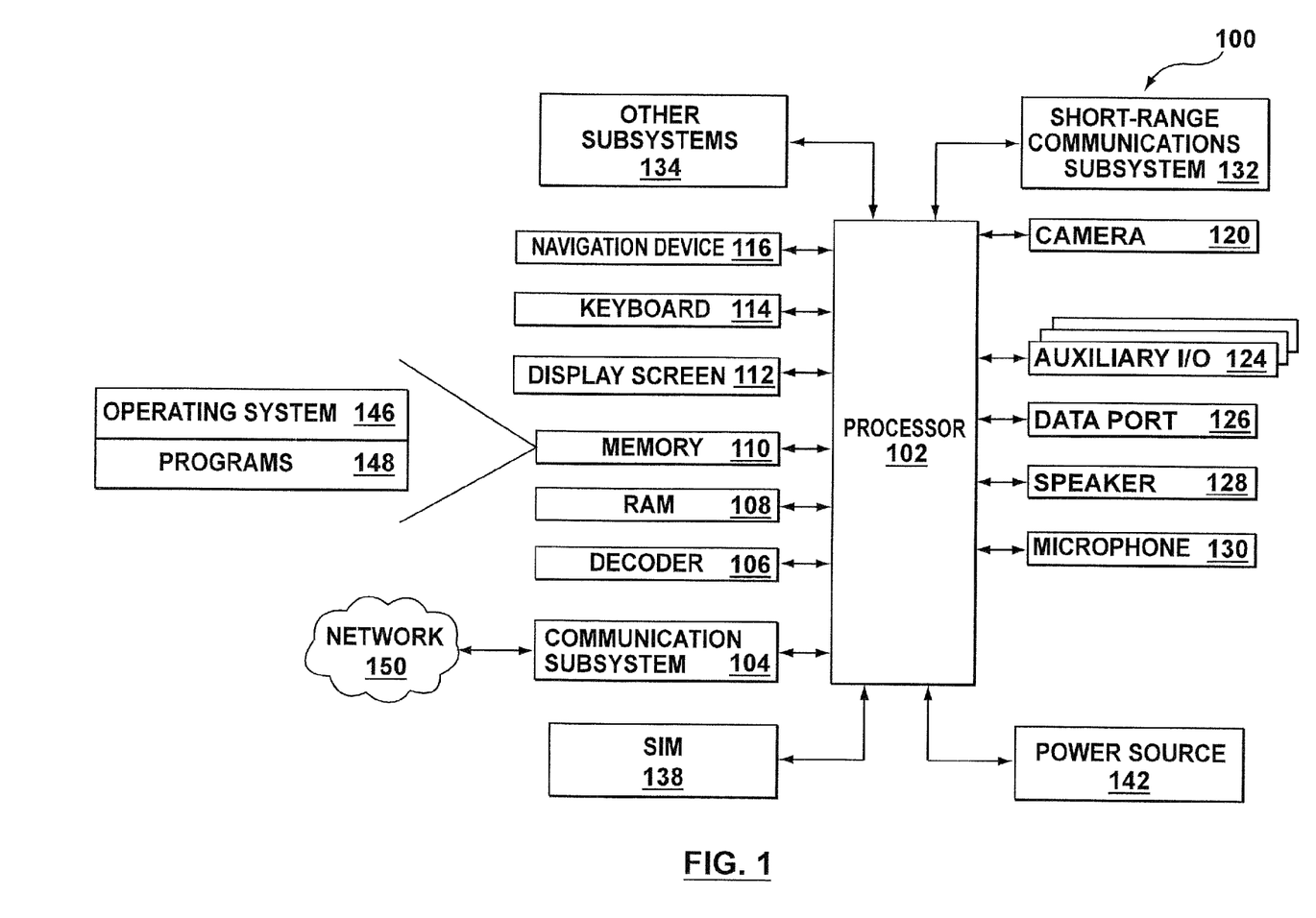
FIG. 1 is a simplified block diagram of components including internal components of a portable electronic device in accordance with one example embodiment.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display screen 112 (such as a liquid crystal display (LCD)), a keyboard 114, a navigation device 116, a digital camera 120, one or more auxiliary input/output (I/O) subsystems 124, a data port 126 (such as a universal serial bus (USB) port), a speaker 128, a microphone 130, short-range communications subsystem 132, and other device subsystems 134. The navigation device 116 may be a depressible/clickable trackball, a depressible/clickable scroll wheel, a touch-sensitive optical trackpad, or a touch-sensitive touchpad. User-interaction with a graphical user interface (GUI) is performed via input devices such as the keyboard 114 and navigation device 116. Information, such as text, characters, symbols, images, icons, and other items that may be displayed or rendered on the portable electronic device, is displayed on the display screen 112 via the processor 102.

The auxiliary I/O subsystems 124 may include one or more of the following: control buttons or keys, a numeric or special function keypad, a touch-sensitive display, a notification light such as a light emitting diode (LED), or a vibrator or other mechanism for providing haptic/touch feedback. In other embodiments, a touch-sensitive display may be provided instead of or in addition to the keyboard 114 and navigation device 116 described above.

To identify a subscriber for network access, the portable electronic device 100 uses as a Subscriber Identity Module (SIM) card 138 for communicating with the wireless network 150. The SIM card 138 is a smart card which stores data to authenticate and identify a subscriber for communication with the wireless network 150 and possibly other networks. The data stored by the SIM card 138 and the configuration of the SIM card 138 depends on the type of wireless network(s) 150 with which the SIM card 138 is designed to operate. Examples of different SIM card types include a Universal Integrated Circuit Card (UICC) for use with a Global System for Mobile communications (GSM) and Universal Mobile Telecommunications System (UMTS) networks, and a Removable User Identity Module (R-UIM) card for use with Code Division Multiple Access (CDMA) networks.

The SIM card 138 stores network specific information used to authenticate and identify subscribers on the wireless network(s) 150 with which it is designed to operate including, for example, an Integrated Circuit Card ID (ICC-ID), International Mobile Subscriber Identity (IMSI), Authentication Key (Ki), Local Area Identity (LAI) and operator specific Emergency Number. The SIM card 138 may also store carrier specific data such as the SMSC (Short Message Service Center) number, Service Provider Name (SPN), Service Dialing Numbers (SDN), Advice-Of-Charge parameters and Value Added Service (VAS) applications.

The portable electronic device 100 includes an operating system 146 and software applications or programs 148 that are executed by the processor 102 and are typically stored in a persistent, updatable store such as the memory 110. Additional applications or programs 148 may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display screen 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
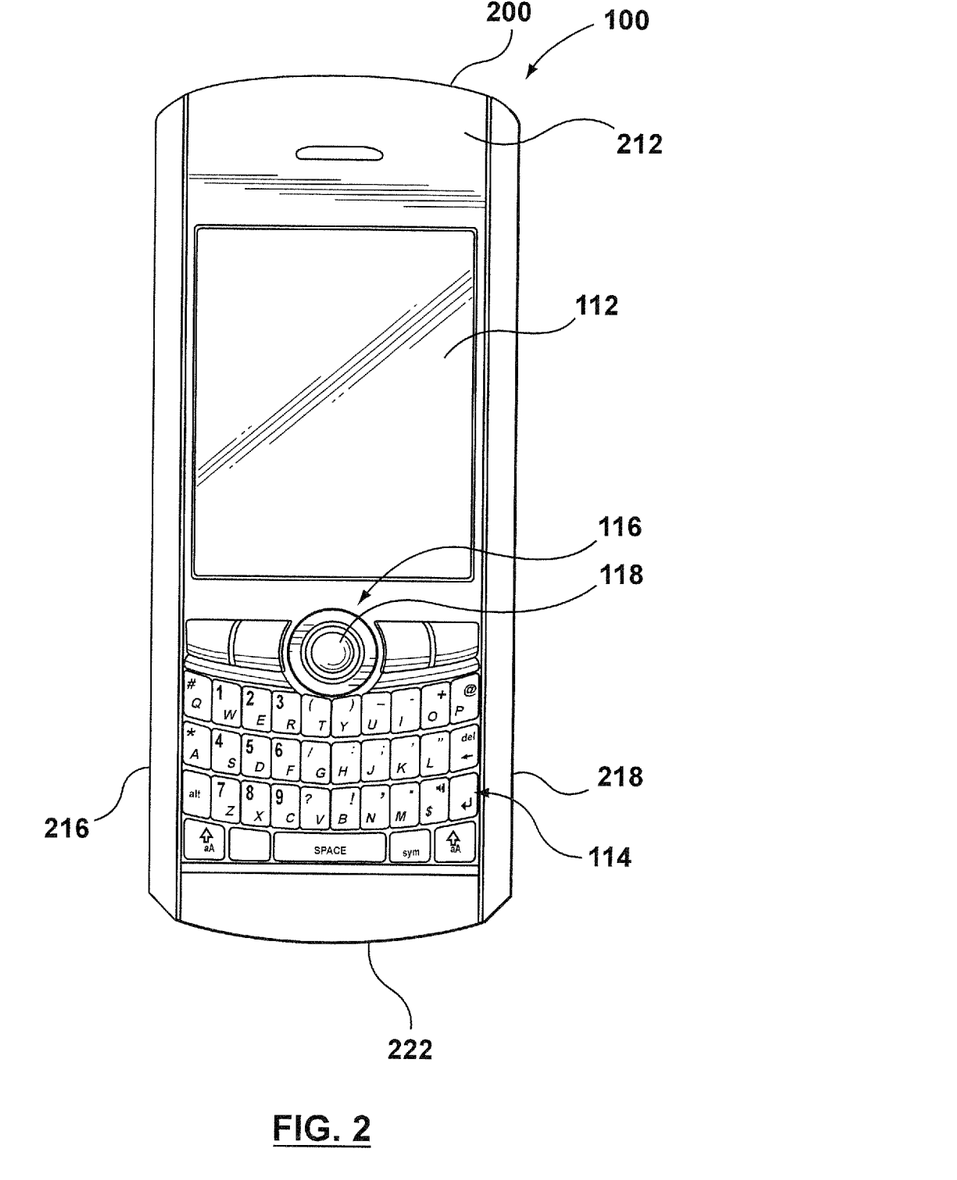
FIG. 2 is a front view of an example embodiment of a portable electronic device in a portrait orientation.

FIG. 2 shows a front view of an example embodiment of the portable electronic device 100 in a portrait orientation. The portable electronic device 100 includes a housing 200 that houses device components including the internal components shown in FIG. 1. The housing 200 frames the display screen 112, keyboard 114 and navigation device 116 so that these components are exposed for user-interaction when the portable electronic device 100 is in use.

Figure 3:
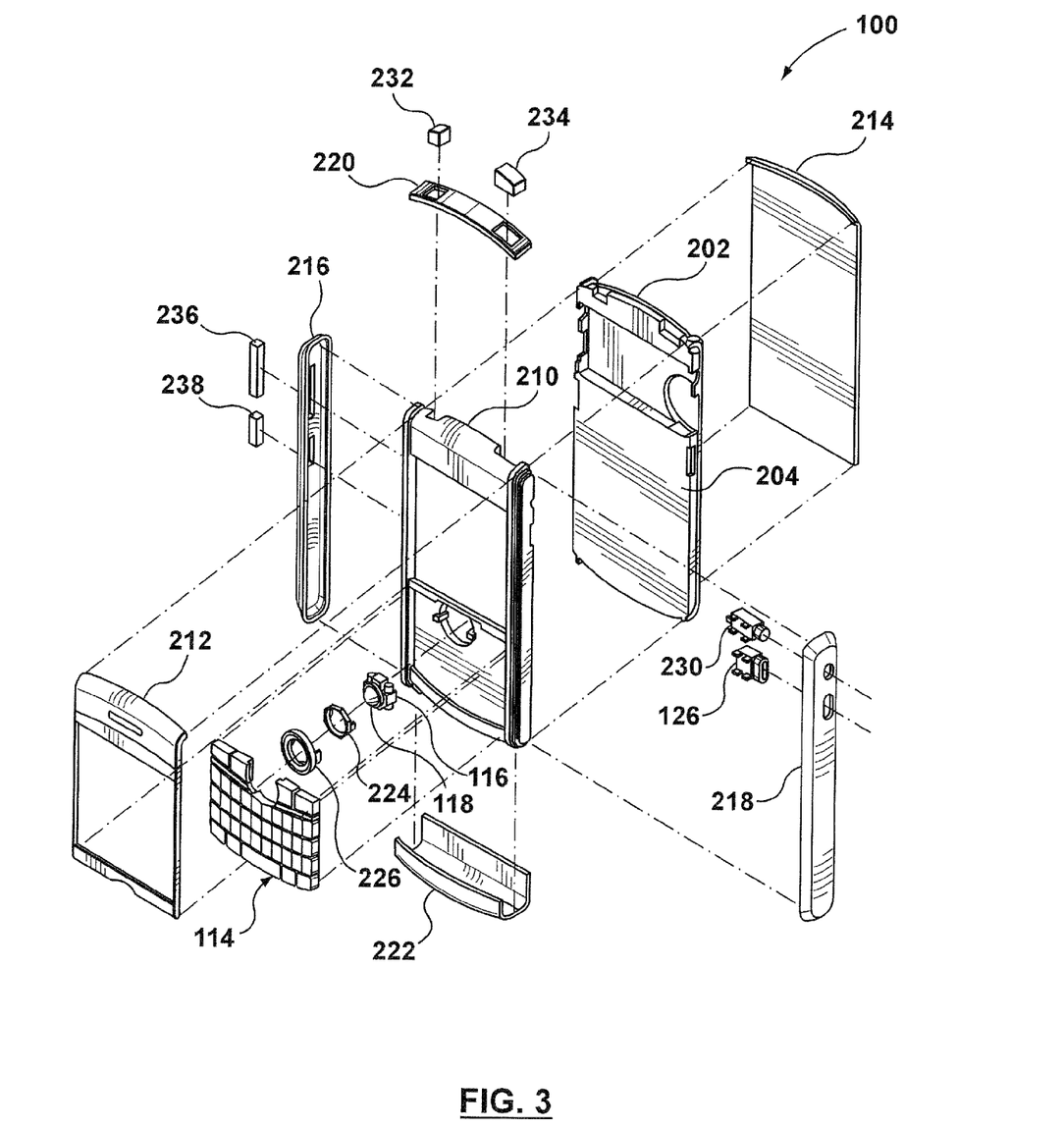
FIG. 3 is an exploded perspective view of the portable electronic device of FIG. 2.

FIG. 3 shows an exploded perspective view of the portable electronic device 100 shown in FIG. 2. The portable electronic device 100 includes a base or chassis 202 to which the housing 200 and internal components of the portable electronic device 100 are directly or indirectly mounted. The base 202 also provides mechanical support for the portable electronic device 100 and its components. The base 202 can be any suitable base. In the shown embodiment, the base 202 includes a rigid printed circuit board (PCB) 204 which forms a main circuit board of the portable electronic device 100 to which internal components such as those shown in FIG. 1 are mounted. The PCB 204 provides a substrate for mounting and supporting the internal components of the portable electronic device 100 on one or both of its top and bottom sides (depending on the embodiment) and provides some electrical circuitry for the device components, as defined by circuit traces within its various layers. In other embodiments, the base 202 includes a stiffener which supports a flexible PCB which forms the main circuit board of the portable electronic device 100.

The housing 200 can be any suitable housing configured for housing the internal components shown in FIG. 1. The housing 200 is dimensioned to be held with one or two hands while the portable electronic device 100 is in use. In the shown embodiment, the housing 200 comprises a frame 210, a front plate 212 having a lens for protecting the display screen 112, a back plate 214, a left side cap 216, a right side cap 218, a top plate 220, and a bottom cap 222. The directional references used in the present disclosure, such as front, back, left side, right side, top and bottom provide relative positional references for device components for convenience only and are not meant to be limiting, unless otherwise noted.

Figure 6A:
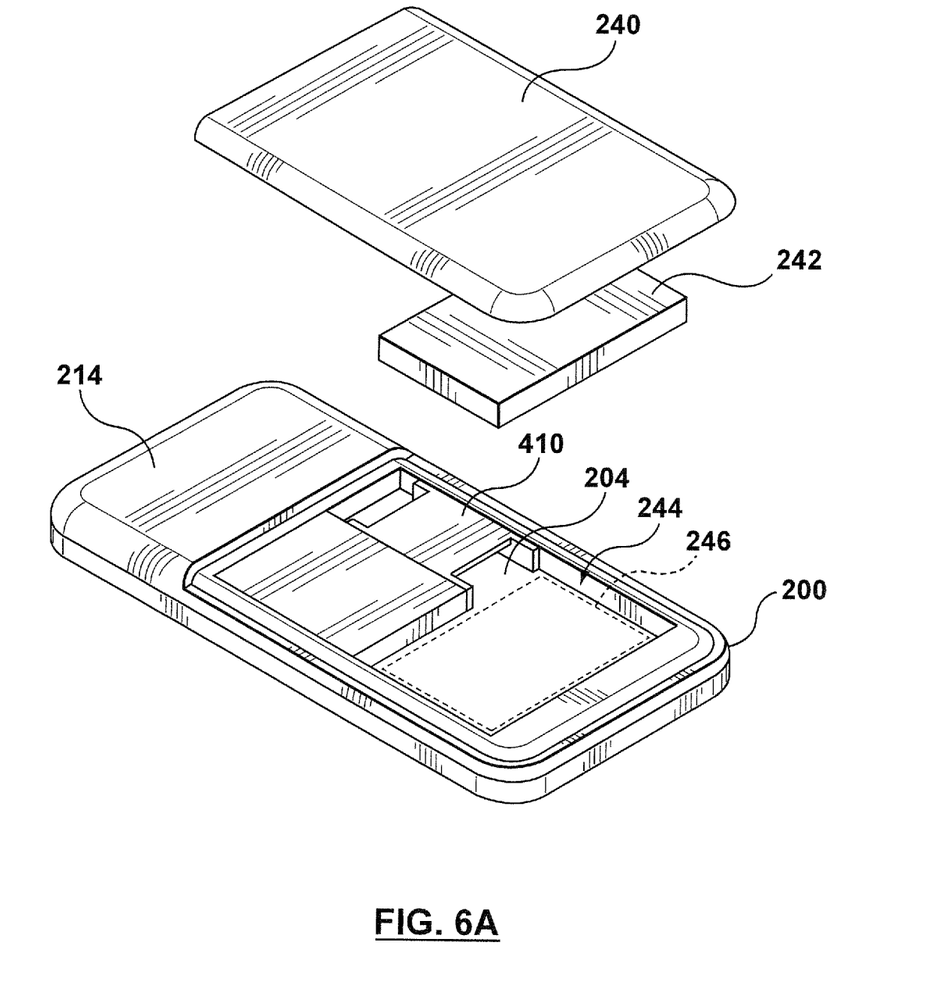
FIGS. 6A to 6C are exploded perspective views of a back of the portable electronic device of FIG. 2 showing the SIM card holder of FIG. 5.
Figure 6B:
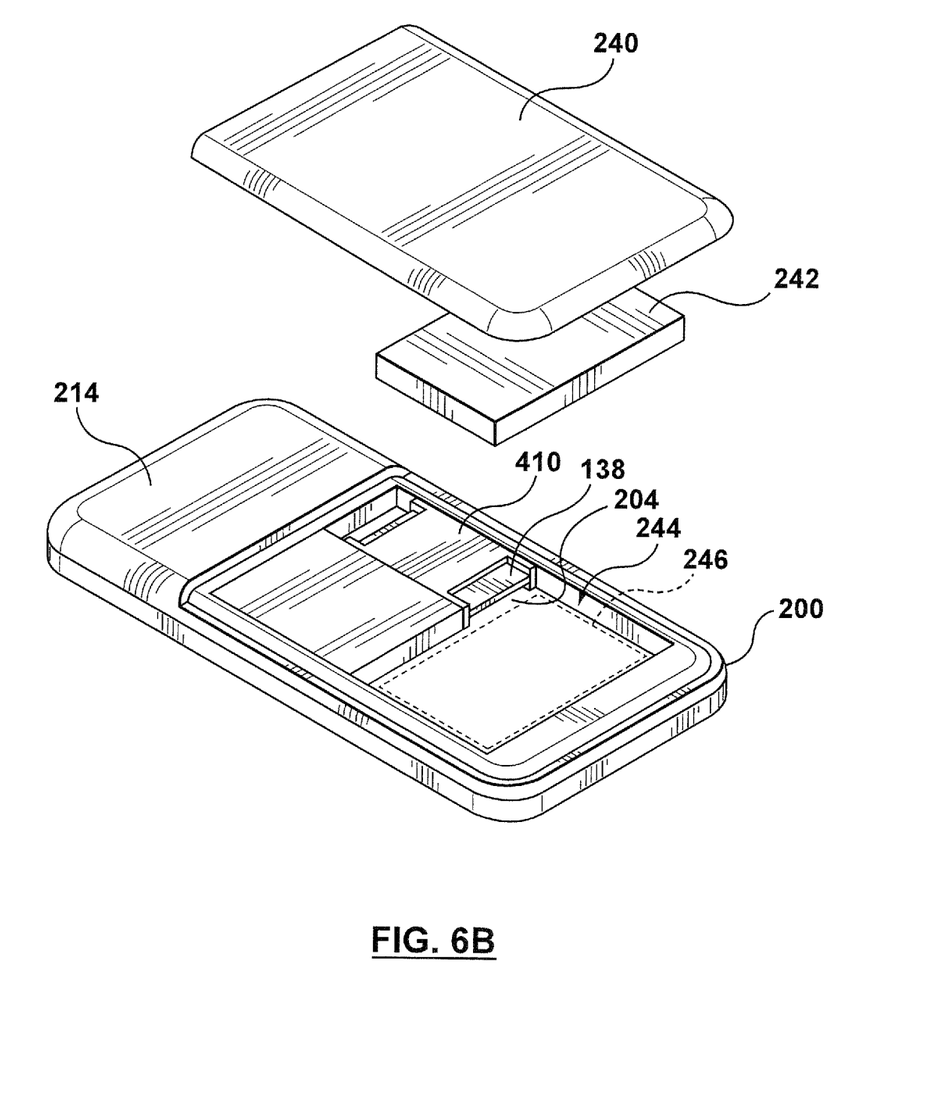
Figure 6C:
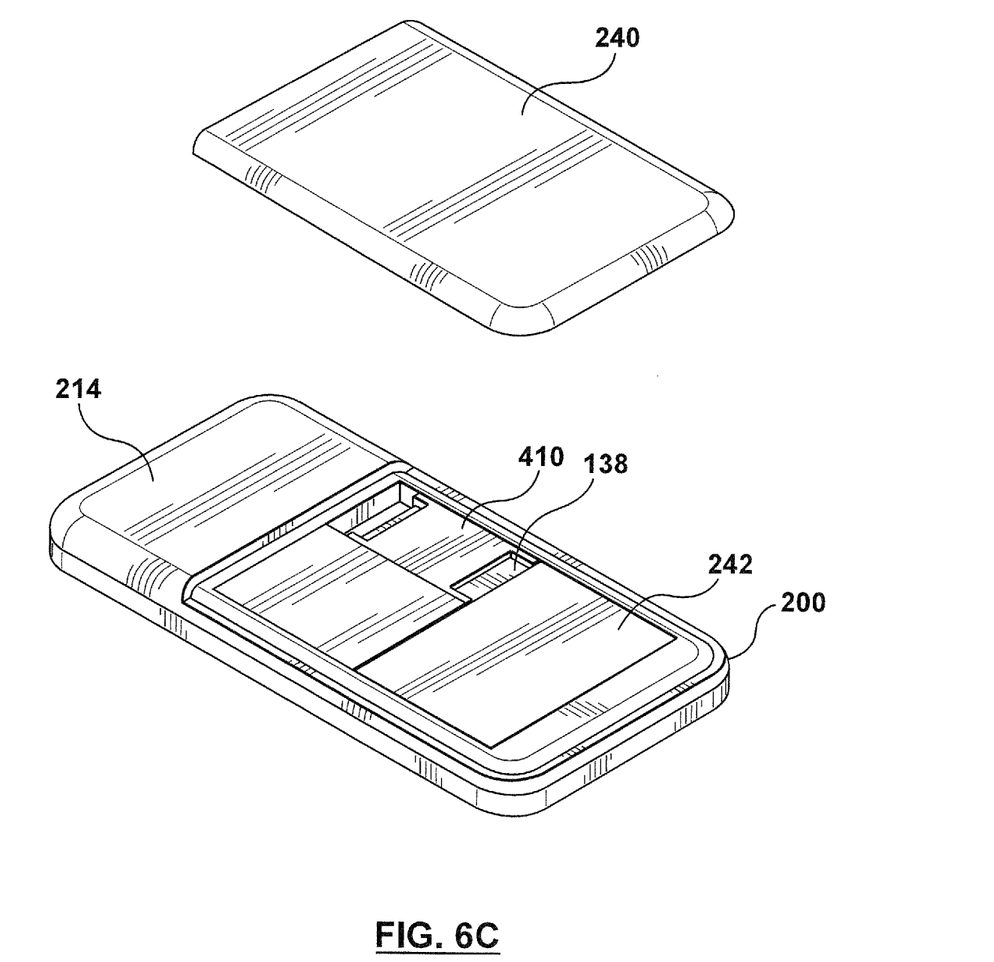

The frame 210 and back plate 214 extend generally parallel to the base 202. As shown in FIGS. 6A to 6C, the back plate 214 may include a cover plate 240 that is releasably attached for insertion and removal of, for example, a battery 242 provided by the power source 142 and the SIM card 138 referred to above. It will be appreciated that the housing 200 may be made of plastic and formed, for example, using injection molded parts. In the example embodiment shown in FIGS. 2 and 3, the frame 210 is generally rectangular with rounded corners although other shapes are possible.

The keyboard 114 and navigation device 116 are connected to the frame 210 and PCB 204 so as to be exposed on the front face of the portable electronic device 100. In the shown embodiment, the navigation device 116 comprises a depressible (or "clickable") rolling member such as a trackball 118 which may be used to move an onscreen position indicator (also known as a caret or focus) through the GUI of the portable electronic device 100. In other embodiments, another type of navigation device 116 may be used such as a depressible/clickable scroll wheel, a touch-sensitive optical trackpad, or a touch-sensitive touchpad. In the shown embodiment, the keyboard 114 is a full keyboard; however, a reduced keyboard or a virtual keyboard provided on a touch-sensitive display could be used in other embodiments.

In the shown embodiment, the navigation device 116 is frictionally engaged within the frame 210. The depressible trackball 118 is held within an opening in the frame 210 through the use of an inner removable ring 224 and outer removable ring 226. The removable rings 224, 226 ensure that the navigation device 116 and its trackball 118 are properly held in place. If desired, the trackball 118 may be removed without removal of the entire navigation device 116. The removal of the trackball 118 is enabled through the use of the outer removable ring 226 and inner removable ring 224.

The data port 126 and a headphone or earphone jack 230 are connected to the PCB 204 and are further held in place by the right side cap 218. Control buttons 232, 234, 236, 238 located on the top and left side of the portable electronic device 100 are also connected to the PCB 204. The control buttons 232, 234 are further held in place by the top plate 220, and the control buttons 236, 238 are further held in place by the left side cap 216. In some embodiments, the control button 232 is a power ON/OFF toggle button, the control button 234 is a speaker mute ON/OFF toggle button, and the control buttons 236 and 238 are volume up and volume down buttons respectively.

Figure 4:
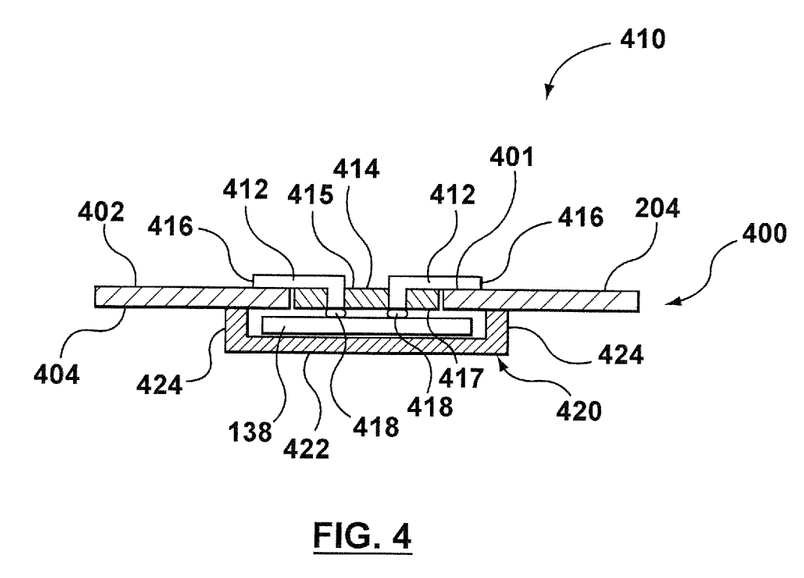
FIG. 4 is a diagrammatic, sectional view of an example embodiment of an electronic assembly for releasably securing a SIM card in accordance with the present disclosure.
Figure 5:
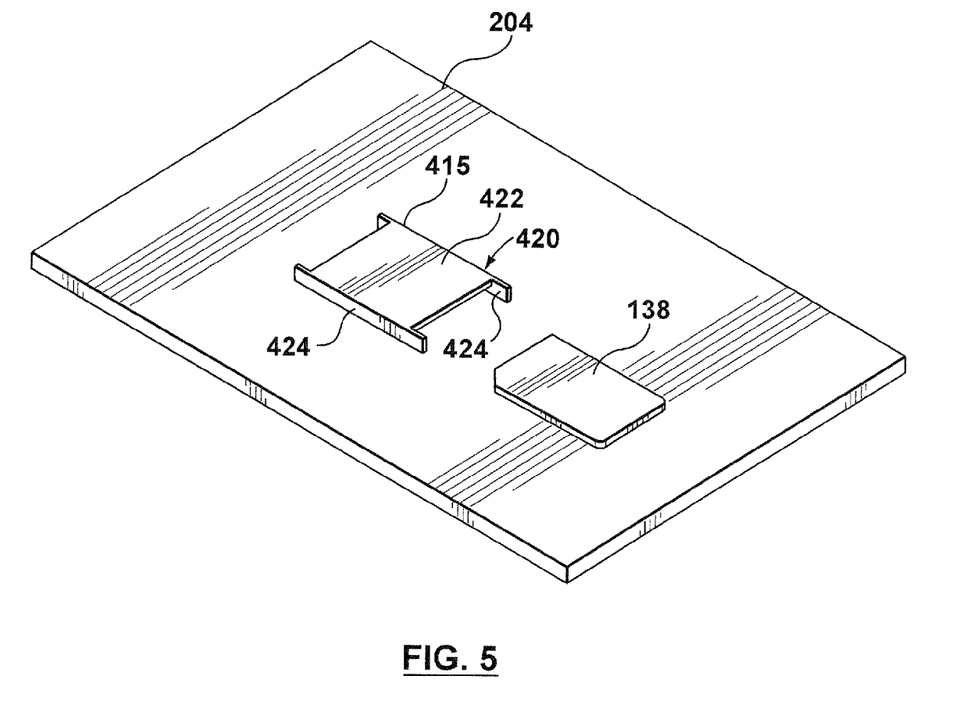
FIG. 5 is an exploded perspective view of a printed circuit board having a SIM card holder in accordance with the electronic assembly of the present disclosure.

Referring now to FIGS. 4 to 6C, one example embodiment of an electronic assembly 400 for releasably securing the SIM card 138 in accordance with the present disclosure will be described. FIG. 4 shows an exploded perspective view of the electronic assembly 400. FIG. 4 is a sectional view of the electronic assembly 400. FIG. 5 is an exploded perspective view of the PCB 204 having a SIM card holder 410 in accordance with the electronic assembly 400. FIGS. 6A to 6C are exploded perspective views of a back of the portable electronic device 100 of FIG. 2 showing the SIM card holder 410 and its relation to the battery 242 of the device 100.

As best shown in FIG. 4, the PCB 204 is formed with an opening or aperture 401 extending from a first side 402 of the PCB 204 through to a second side 404 of the PCB 204. The first and second sides 402 and 404 may be a top or bottom of the PCB 204. Device components may be mounted to one or both of the first and second sides 402, 404 of the PCB 204. The aperture 401 in the shown embodiment is located towards a centre of the PCB 204 and away from its edges, however, the aperture 401 may be located at or towards the edges of the PCB 204 to provide an edge mounted SIM card holder 410 in other embodiments. Device components such as a battery 242 of the power source 142 and the keyboard 114 may be assembled into the portable electronic device 100 so that the components may be placed near or in contact with the SIM card holder 410.

The electronic assembly 400 includes the PCB 204 and the SIM card holder 410 mounted thereto. The SIM card holder 410 comprises a base 414 that is received in the aperture 401, a card retaining member 420 attached to the PCB 204, contacts 418 for interfacing with corresponding contacts or terminals (not shown) on the SIM card 138, and electrical connectors 412 which connect the contacts of the SIM card holder 410 to the PCB 204. The number and type of electrical connectors 412 may vary between embodiments. It will be appreciated that unlike conventional SIM card holders, the base 414 and card retaining member 420 are separate parts that are indirectly connected via the PCB 204 rather than being elements of a single integrated part.

The base 414 may be made from plastic or other suitable non-conductive material such as a heat resistant plastic or other suitable heat resistant and non-conductive material. The base 414 provides a mechanical support for securing the electrical connectors 412 and contacts 418, provides alignment during surface mounting processes, and provides mechanical strength during use of the portable electronic device 100. The base 414 has a first side 415 and opposed second side 417 in approximate alignment with the first side 402 and second side 404 of the PCB 204, respectively.

The electrical connectors 412 are configured to suspend the base 414 within the aperture 401 formed in the PCB 204 such that the base 414 and the PCB 204 are substantially aligned in a common plane. The electrical connectors 412 extend through the base 414 from its first side 415 to its second side 417, and may be at least partially embedded in the base 414. The electrical connectors 412 are connected to the contacts 418 for interfacing with the SIM card 138 on the second side 417 of the base 414.

The electrical connectors 412 have a first end 416 that is attached or mounted to corresponding contacts (not shown) on the first side 402 of the PCB 204 and a second end opposite to the first end 416. The first end 416 of the electrical connectors 412 may be soldered or welded to the contacts on the PCB 204 using surface mount technology techniques. The second end of the electrical connectors 412 is connected to the contacts 418 for interfacing with the SIM card 138. It will be appreciated that the SIM card holder 410 is "reverse mounted" to the PCB 204 in that it is electrically connected to the first side 402 of the PCB 204 via the electrical connectors 412 while the card retaining member 420 and contacts 418 for interfacing with the SIM card 138 are located on the second side 404 of the PCB 204 opposite to the first side 402.

As best shown in FIG. 4, the electrical connectors 412 may be generally L-shaped in some embodiments. In such embodiments, the electrical connectors 412 may include a first linear portion and a second linear portion generally perpendicular to the first linear portion. The first linear portion is longer than the second linear portion and includes the first end 416 which is attached to contacts on the first side 402 of the PCB 204. The second linear portion includes the second end which is connected to the contacts 418 for interfacing with the SIM card 138. The second linear portion may be embedded within the base 414. The electrical connectors 412 may be, but are not necessarily limited to, gull wing connectors. It will be understood by persons skilled in the art that the term "gull wing connector" refers to any type of electrical connector having an angled portion that causes one end of the connector to lie in a different plane than the remaining portion of the connector.

The contacts 418 are connected to the electrical connectors 412 for providing a communication path for reading data from the SIM card 138 and optionally writing data to the SIM card 138. Alternatively, the contacts 418 and electrical connectors 412 are formed from a single integrated part. FIG. 4 shows only two contacts 418 to avoid obscuring the details of the electronics assembly 400 of the present disclosure. It will be appreciated that the number of contacts 418 provided by the SIM card holder 410 will depend on the type and configuration of the SIM card 138.

The card retaining member 420 is secured to the second side 404 of the PCB 204 and spans at least the aperture 401 formed in the PCB 204. The card retaining member 420 is configured for releasably securing (holding, retaining, etc.) the SIM card 138. In some embodiments, the SIM card holder 410 may be a contact-type SIM card holder which releasably retains the SIM card 138 in place. In such embodiments, the card retaining member 420 forms the housing of contact-type SIM card holder and the contacts 418 are the contacts of the contact-type SIM card holder. As will be understood to persons skilled in the art, a contact-type SIM card holder is configured to releasably retain the SIM card 138 such that its contacts (not shown) interface with the contacts 418 of the SIM card holder 410. Alternatively, in other embodiments the SIM card holder 410 may be a receiver/push-in type SIM card holder. As will be understood to persons skilled in the art, a receiver/push-in type SIM card holder is configured to releasably retain the SIM card 138 by friction holding the contacts (not shown) of the SIM card 138 against the contacts 418 of the SIM card holder 410. In such embodiments, the card retaining member 420 forms the housing of the receiver/push-in type SIM card holder and the contacts 418 are the contacts of the receiver/push-in type SIM card holder.

While retained in the card retaining member 420, the contacts 418 of the SIM card holder 410 are held in contact with corresponding contacts (not shown) of the SIM card 138, which interface the SIM card 138 with the processor 102 of the portable electronic device 100. When the respective contacts are interfaced, a communication path is created for the processor 102 to read data from the SIM card 138 and optionally write data to the SIM card 138.

As best shown in FIG. 5, in some embodiments the card retaining member 420 may be a three-sided housing comprising a support member 422 for supporting the SIM card 138 and a pair of substantially parallel sidewalls 424 located at opposite sides of the support member 422. In the shown embodiment, the support member 422 is a substantially planar member which spans at least the aperture 401 (not shown) in the PCB 204. The sidewalls 424 are secured to the second side 404 of the PCB 204. The card retaining member 420 may be secured using a suitable adhesive, soldered or welded to the PCB 204 when constructed from metal, or any other suitable surface mounting technique known in the art based on its material of construction. In some embodiments, the card retaining member 420 may be a four-sided housing similar to the housing described above and further including an end wall (not shown) which may be secured to the second side 404 of the PCB 204. The end wall provides an end stop for abutting the SIM card 138 when it is inserted in the card retaining member 420. The end wall may be located to align the contacts 418 of the SIM card holder 410 with the contacts (not shown) of the SIM card 138 when it is secured in the SIM card holder 410. The card retaining member 420 may be made of any suitable material. In some embodiments, the material from which the card retaining member 420 is constructed may be selected to provide electromagnetic shielding against radio frequency ("RF") electromagnetic radiation, also known as RF shielding.

Referring to FIGS. 6A to 6C, the SIM card holder 410 and its relation to the battery 242 and other components of the portable electronic device 100 will be described. The back plate 214 of the housing 200 includes a cover plate 240 that is releasably attached for accessing an interior compartment or cavity 244 of the housing 200. The interior compartment 244 is configured for insertion and removal of the battery 242, the SIM card 138, and possibly other device components. It will be understood that the exact location of the SIM card 138 on the PCB 204 and its relationship to the device components will depend on the particular design of the PCB 204 as well as on the particular design of the portable electronic device 100 and its housing 200. While the Figures show a portable electronic device 100 with a housing 200 of unibody construction, it is contemplated that the portable electronic device 100 may be of an alternative construction such as that commonly known as a "clamshell" or "flip-phone" construction style or a "slider phone" construction. All such variations and designs are intended to be within the scope of the present disclosure.

FIG. 6A shows the interior compartment 244 with the SIM card 138 removed from the SIM card holder 410 of the electronic assembly 400. As noted above, the SIM card holder 410 is configured to releasably receive the SIM card 138 to permit a device user to remove and reinsert the SIM card 138 or a different but compatible SIM card. The SIM card holder 410 is located in the interior compartment 244 adjacent to a battery compartment 246 for receiving the battery 242. The battery compartment 246 in the shown embodiment is configured to locate the battery 242 within the interior compartment 244 so as to provide a stop which prevents the SIM card 138 from being removed from the SIM card holder 410 when the battery 242 is received in the battery compartment 246. To achieve this, the components are configured and located so that any space between an installed SIM card 138 and an installed battery 242 is too small to remove the SIM card 138. In some embodiments, the SIM card 138 may be effectively inaccessible while the battery 242 is installed. FIG. 6B shows the interior compartment 244 with the SIM card 138 releasably received in the SIM card holder 410. FIG. 6C shows the interior compartment 244 with the battery 242 received in the battery compartment 246. In the shown configuration of FIG. 6C, the SIM card 138 cannot be removed while the battery 242 is received in the battery compartment 246. This prevents the SIM card 138 from being removed while the portable electronic device 100 is powered on.

In other embodiments (not shown), the interior compartment 244 may define the battery compartment 246 for receiving the battery 242 located above the SIM card holder 410. This causes the battery 242 to be installed over the SIM card 138, thereby preventing the SIM card 138 from being removed while the battery 242 is installed. As a result of the location of the battery compartment 246 relative to the SIM card 138, a larger battery may be used. In some embodiments, the battery compartment 246 is substantially the same size as the PCB 204, allowing batteries which are similarly sized to be used.

The electronic assembly 400 described above provides an alternative solution for releasably securing a SIM card 138 which may be used to reduce the thickness of a host portable electronic device 100, to free up space for other device components, or both. Typically, in known device designs the SIM card holder is surface mounted to the PCB of the portable electronic device with the result that its overall thickness is directly affected by the physical dimensions of the SIM card reader. The electronic assembly of the present disclosure mounts the SIM card holder within an aperture in the PCB 204 rather than surface mounting the SIM card reader. This results in a reduced local thickness of the PCB 204 at the location where the SIM card holder 410 is mounted. The electronic assembly 400 may result in a reduction in the device thickness of approximately about 0.5 mm compared with conventional surface mounted SIM card holders. The electronic assembly 400 may also result in reduced manufacturing costs compared with surface mounted SIM card holders.

The electronic assembly 400 also provides additional flexibility in the design of the portable electronic device 100 in that a reduction in the overall device thickness may allow more and different choices in device components. It will be appreciated that device components, such as the battery, are selected to meet the required device thickness when the device thickness is fixed. Some battery types are sufficiently large that the battery covers a large portion of the PCB 204, or possibly all of the PCB 204, depending on the configuration of the portable electronic device 100. For example, some batteries are substantially the same size as the portable electronic devices which carry them. Batteries of this type are typically unsuitable for designs requiring a reduced device thickness, or are difficult to design for. Device designs such as the electronic assembly 400 which reduce the overall device thickness allow relatively large batteries and other types of device components to be used which may be otherwise unsuitable based on the whole of the design constraints.

The example embodiments presented above are merely examples and are in no way meant to limit the scope of this disclosure. Variations of the innovations described herein will be apparent to persons of ordinary skill in the art. These variations are within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An assembly comprising:
a printed circuit board (PCB) having opposed first and second sides and defining an aperture extending from the first side to the second side; and
a SIM card holder configured for retaining a SIM card and comprising:
a base received in the aperture;
a plurality of SIM contacts for interfacing with corresponding contacts of the SIM card;
a plurality of electrical connectors each having a first end and a second end, the electrical connectors being at least partially embedded in the base and extending through the base, the first end of each electrical connector being located on a first side of the base and connected to a respective contact on the first side of the PCB and the second end of each electrical connector being located on a second side of the base and connected to a respective SIM contact, wherein the electrical connectors are configured to suspend the base within the aperture of the PCB so that the base and the PCB are substantially aligned in a common plane; and
a card retaining member attached to the second side of the PCB and configured for releasably securing the SIM card, the card retaining member comprising a three-sided housing including a support member and a pair of substantially parallel sidewalls located at opposite sides of the support member, wherein the sidewalls of the card retaining member are surface mounted to the second side of the PCB.

2. The assembly of claim 1, wherein the support member spans at least the aperture in the PCB.

3. The assembly of claim 1, wherein the card retaining member further comprises an end wall providing an end stop for the SIM card when inserted in the card retaining member.

4. The assembly of claim 1, wherein the base is made from a non-conductive material.

5. The assembly of claim 1, wherein the base is made from plastic.

6. The assembly of claim 1, wherein the electrical connectors are gull wing connectors.

7. The assembly of claim 1, wherein the aperture in the PCB and the SIM card holder are located towards a centre of the PCB.

8. The assembly of claim 1, wherein the card retaining member provides RF shielding.

9. The assembly of claim 1, wherein the SIM card holder is a contact-type SIM card holder which releasably retains the SIM card in place, wherein the card retaining member forms a housing of contact-type SIM card holder.

10. The assembly of claim 1, wherein the SIM card holder is a receiver/push-in type SIM card holder which releasably retains the SIM card by friction holding contacts of the SIM card against the SIM contacts of the SIM card holder, wherein the card retaining member forms a housing of the receiver/push-in type SIM card holder.

11. The assembly of claim 1, wherein the base and the card retaining member of the SIM card holder are separate parts which are indirectly connected via the PCB.

12. A portable electronic device, comprising:
a printed circuit board (PCB) having opposed first and second sides and defining an aperture extending from the first side to the second side;
a housing; and
a Subscriber Identity Module (SIM) card holder for retaining a SIM card and comprising:
a base received in the aperture in the PCB;
a plurality of SIM contacts for interfacing with corresponding contacts of the SIM card;
a plurality of electrical connectors each having a first end and a second end, the electrical connectors being at least partially embedded in the base and extending through the base, the first end of each electrical connector being located on a first side of the base and connected to a respective contact on the first side of the PCB and the second end of each electrical connector being located on a second side of the base and connected to a respective SIM contact, wherein the electrical connectors are configured to suspend the base within the aperture of the PCB so that the base and the PCB are substantially aligned in a common plane; and
a card retaining member attached to the second side of the PCB and configured for releasably securing the SIM card, the card retaining member comprising a three-sided housing including a support member and a pair of substantially parallel sidewalls located at opposite sides of the support member, wherein the sidewalls of the card retaining member are surface mounted to the second side of the PCB.

13. The portable electronic device of claim 12, wherein the housing defines an interior compartment and includes a cover plate releasably attached thereto for accessing the interior compartment, and wherein the SIM card holder is accessible from the interior compartment for insertion and removal of the SIM card.

14. The portable electronic device of claim 13, wherein the interior compartment defines a battery compartment for receiving a battery located above the SIM card holder.

15. The portable electronic device of claim 14, wherein the battery compartment is substantially the same size as the PCB.

16. The portable electronic device of claim 13, wherein the interior compartment defines a battery compartment for receiving a battery located within the interior compartment, the SIM card holder being located in the interior compartment adjacent to the battery compartment.

17. The portable electronic device of claim 12, wherein the support member spanning at least the aperture in the PCB.

18. The portable electronic device of claim 12, wherein the SIM card holder is a contact-type SIM card holder which releasably retains the SIM card in place, wherein the card retaining member forms a housing of contact-type SIM card holder.

19. The portable electronic device of claim 12, wherein the SIM card holder is a receiver/push-in type SIM card holder which releasably retains the SIM card by friction holding contacts of the SIM card against the contacts of the SIM card holder, wherein the card retaining member forms a housing of the receiver/push-in type SIM card holder.

\* \* \* \* \*